United States Patent
Baker et al.

(10) Patent No.: US 6,519,259 B1
(45) Date of Patent: Feb. 11, 2003

(54) METHODS AND APPARATUS FOR IMPROVED TRANSMISSION OF VOICE INFORMATION IN PACKET-BASED COMMUNICATION SYSTEMS

(75) Inventors: Albert D. Baker, Lincroft, NJ (US); Anthony J. Spagnolo, Branchburg, NJ (US); Richard Szajdecki, Jackson, NJ (US); Craig P. Wierzbicki, Metuchen, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/252,252

(22) Filed: Feb. 18, 1999

(51) Int. Cl.$^7$ .............................. H04J 3/16; H04L 12/56
(52) U.S. Cl. .............................. 370/395.4; 370/395.61; 370/468
(58) Field of Search ................................ 370/229, 230, 370/230.1, 235, 252, 477, 521, 540, 395.4, 395.41, 395.42, 395.43, 395.61, 419, 420, 462, 468, 537

(56) References Cited

U.S. PATENT DOCUMENTS

| | | | | |
|---|---|---|---|---|
| 5,898,696 A | * | 4/1999 | Proctor et al. | 370/468 |
| 5,911,128 A | * | 6/1999 | DeJaco | 704/221 |
| 5,970,412 A | * | 10/1999 | Maxemchuk | 455/447 |
| 6,266,322 B1 | * | 7/2001 | Berger et al. | 370/229 |

OTHER PUBLICATIONS

"AAL Type 2 Service Specific Convergence Sublayer for Trunking," ITU—Telecommunication Standardization Sector, Draft Recommendation I.366.2, Temporary Document 24–E (PLEN), pp. 1–91, Jun. 1998.

"Voice over Frame Relay Implementation Agreement," Frame Relay Forum Technical Committee Contribution, FRFTC 96–025R2, pp. 1–73, Sep. 1996.

"Voice Packetization—Packetized Voice Protocols," ITU–CCITT Recommendation G.764, pp. 1–21, Geneva, 1990.

"Digital Circuit Multiplication Equipment Using ADPCM (Recommendation G.726) and Digital Speech Interpolation," ITU–CCITT Recommendation G.763, pp. 1–50, Jan. 1994.

T. Chu et al., "A SSCS Design for the Landline Trunking Application," ATM Forum, pp. 1–10, Apr.–May 1997.

T. Chu, "Proposed Procedure to Change the Encoding Rule in Mid–call," ATM Forum, pp. 1–6, Apr.–May 1997.

* cited by examiner

*Primary Examiner*—Min Jung
(74) *Attorney, Agent, or Firm*—Ryan, Mason & Lewis, LLP (57) ABSTRACT

A packet-based communication system includes a transmitter which configures multiple channels of encoded voice information for transmission through the system to a receiver. In an illustrative embodiment, the transmitter determines a total number of active channels to be coded at each of a number of different available code rates, within a specified bandwidth constraint. The transmitter assigns the code rates to the active channels in accordance with a code rate assignment technique, such that the bandwidth constraint is satisfied for a defined time period, e.g., a voice channel sample period. The code rate assignment technique may be, e.g., a random rate assignment technique, a round robin rate assignment technique, or an oldest talking channel to lowest rate assignment technique. The transmitter generates packets for a given one of the active channels, encoded at a corresponding assigned code rate, such that a time period between consecutive packets generated for that channel is substantially constant for the duration of a voice call associated therewith.

24 Claims, 6 Drawing Sheets

METHODS AND APPARATUS FOR IMPROVED TRANSMISSION OF VOICE INFORMATION IN PACKET-BASED COMMUNICATION SYSTEMS

FIELD OF THE INVENTION

The present invention relates generally to packet-based communication systems, such as asynchronous transfer mode (ATM) networks, and more particularly to techniques for transmitting voice and other information over such systems.

BACKGROUND OF THE INVENTION

Packet-based communication systems are coming into increasingly widespread use in compressed voice transport applications, such as applications involving transport of multiple encoded voice channels. For example, conventional ATM communication systems provide high-speed, low-delay switching of voice, data, video and other types of user information traffic. In an ATM system, the user information traffic is separated into fixed-length 53-byte cells. Each ATM cell typically includes a 5-byte header and a 48-byte payload. The header incorporates a virtual channel identifier (VCI) and a virtual path identifier (VPI) associated with the corresponding cell. The VCI and VPI together specify a virtual connection (VC) which is established when a user requests a network connection in the ATM system. Additional details regarding these and other aspects of ATM systems can be found, for example, in the ATM Forum, "ATM User-Network Interface Specification," Version 3.1, September, 1994, and in Martin de Prycker, "Asynchronous Transfer Mode: Solution for Broadband ISDN," Ellis Horwood, New York, 1993, both of which are incorporated by reference herein.

The ATM standard includes a number of ATM Adaptation Layers (AALs), each specifying different types of connections in an ATM system. One such AAL is known as AAL Type 2, or simply AAL 2. AAL 2 includes a Common Part Sublayer (CPS) which communicates with the ATM layer, and a Service Specific Convergence Sublayer (SSCS) that operates between the CPS and a communication service layer. The purpose of the SSCS is generally to convey narrowband voice and telephony service information, such as voice, voiceband data, or circuit mode data, associated with various voice and telephony communication services. The SSCS specifies packet formats and procedures to encode different call-related data streams for bandwidth-efficient transmit by AAL 2. The SSCS accommodates known techniques of low rate audio encoding, silence compression, and facsimile modulation/demodulation. The CPS provides multiplexing functions which allow many calls to be sent over a single ATM connection. The single ATM connection therefore acts as a trunk group for transmission between two points of access. Additional details regarding AAL 2 and the SSCS can be found in, for example, "AAL Type 2 Service Specific Convergence Sublayer for Trunking," ITU—Telecommunication Standardization Sector, Draft Recommendation 1.366.2, Temporary Document 24-E (PLEN), June 1998, which is incorporated by reference herein.

Existing techniques for supporting compressed voice transport in ATM networks and other types of packet-based communication systems include G.763 DSI and G.764, both defined by the CCITT-ITU standards body. The G.763 DSI technique deals with an overload condition, i.e., a situation in which an additional voice call is to be added to an existing set of active calls utilizing all of the available bandwidth of a given transport stream, by taking one bit from each sample in the given stream, and allocating the resulting freed-up bandwidth to the additional call. The G.764 technique signals the coding rate in each frame of a given transport stream, and organizes the voice samples so that blocks of bits, starting with the least significant bit (LSB), can be identified and dropped if an intermediate network node experiences an overload condition. Unfortunately, these and other known techniques for dealing with compressed voice transport fail to provide an efficient allocation of available bandwidth among multiple channels, and can thus lead to an excessive degradation in reconstructed signal quality in one or more of the channels.

SUMMARY OF THE INVENTION

The invention provides methods and apparatus for communicating information in a packet-based communication system, such that one or more of th e problems associated with the above-noted conventional techniques are overcome. An illustrative embodiment of the invention includes a transmitter which configures multiple channels of encoded voice information for transmission through the system to a receiver. In the illustrative embodiment, the transmitter determines a total number of active channels to be coded at each of a number of different available code rates, within a specified bandwidth constraint. The transmitter assigns the code rates to the active channels in accordance with a code rate assignment technique, such that the bandwidth constraint is satisfied for a defined time period, e.g., a voice channel sample period. The code rate assignment technique may be, e.g., a random rate assignment technique, a round robin rate assignment technique, or an oldest talking channel to lowest rate assignment technique. In the latter case, the code rates are assigned to the channels such that a channel which has been active for a longer period of time than another channel is assigned a lower code rate than the other channel.

In accordance with another aspect of the invention, the transmitter generates packets for the active channels, each encoded at a corresponding assigned code rate, such that a time period between consecutive packets generated for a given channel is substantially constant for the duration of a voice call associated with that channel. In other words, all packets may be transmitted at a substantially constant rate in the time domain. The packet period for a given call, i.e., the time period between consecutive voice packets for that call, thus remains substantially constant for the duration of the call regardless of the speech coder bit rate. This constant emission rate reduces the complexity of the transmitter and the receiver. It also allows the receiver to more readily detect lost, late-arriving or misinserted packets, and to apply corrective treatments in a timely and consistent manner.

Although the above-described illustrative embodiment is particularly well suited for use in the transmission of voice information over an ATM network connection, the invention can also be implemented in other types of packet-based communication systems including, for example, Frame Relay systems and Internet Protocol (IP) systems. In addition, the invention can be applied to other types of audio and non-audio information. These and other features and advantages of the present invention will become more apparent from the accompanying drawings and the following detailed description.

DETAILED DESCRIPTION OF THE INVENTION

The present invention will be illustrated below in conjunction with exemplary ATM processing hardware. It should be understood, however, that the disclosed techniques are suitable for use with a wide variety of other types of packet-based systems including, for example, Frame Relay systems and IP systems, and with any desired type of communication medium, including ADSL, Sonet/SDH, wireless networks, etc. The term "packet" as used herein is intended to include not only ATM cells but also other types of packets used in other packet-based communication systems. The term "voice" as used herein are intended to include human-generated audio information, machine-generated audio information or combinations of these and other types of audio information. It should be noted that the invention is generally applicable to any type of audio information.

Figure 1:
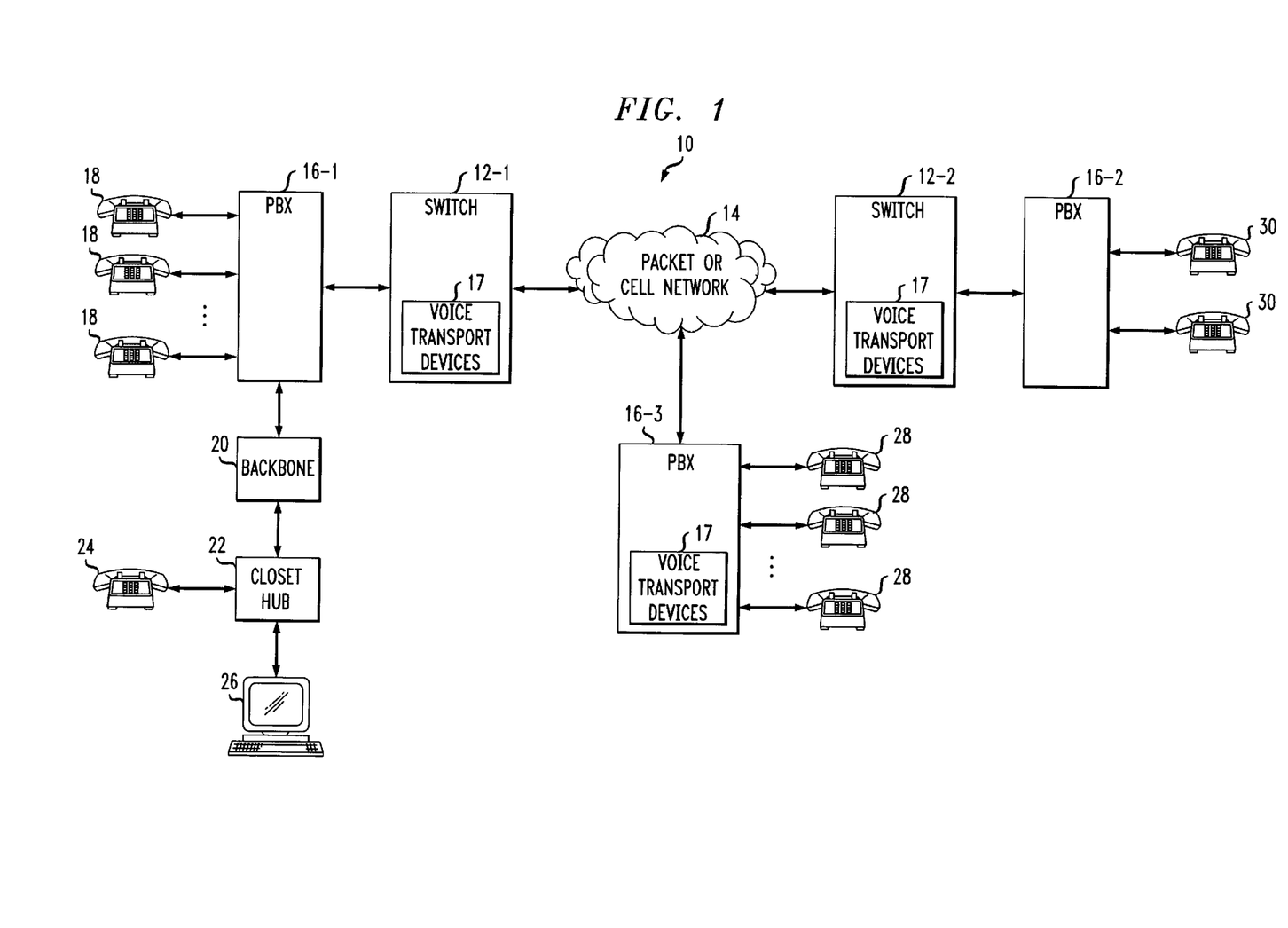
FIG. 1 is a block diagram of an exemplary packet-based communication system including a number of voice transport devices in accordance with the invention.

FIG. 1 shows a packet-based communication system 10 in accordance with the invention. The system 10 includes first and second call processing devices 12-1, 12-2, one or both of which may be an enterprise switch of a business, a carrier edge switch of a service provider, or other like device, e.g., an access concentrator, PBX, access multiplexer device or Subscriber Loop Carrier (SLC) system. The call processing devices 12-1 and 12-2 are connected to communicate over a packet or cell network 14, which may be an ATM network. The system 10 further includes three private branch exchange (PBX) switches 16-1, 16-2 and 16-3. The PBX switches 16-1 and 16-2 connected to call processing devices 12-1 and 12-2, respectively, and PBX 16-3 is connected to network 14. Call processing devices 12-1 and 12-2 and PBX 16-3 are each configured to include a voice transport device 17, which may be a voice packet transmitter, a voice packet receiver, or both a transmitter and a receiver. A given voice transport device 17 may be a component of a more complex device which provides other voice processing functions.

The system 10 supports voice and telephony services using certain conventional devices, such as telephones and computers. For example, the PBX switch 16-1 is connected to telephones 18. The call processing device 12-1 is connected via a backbone 20 to a closet hub 22 which in turn provides connection to a telephone 24 and a multimedia personal computer (PC) 26. The PBX switch 16-3 is connected to telephones 28, and the PBX switch 16-2 connected to call processing device 12-2 is in turn connected to telephones 30. The conventional aspects of the operation of these devices are well understood in the art and therefore not described in detail herein.

The voice transport devices 17 are used to communicate, e.g., voice and telephony information via connections established through the network 14. The call processing devices 12-1 and 12-2 and the PBX 16-3 may each represent different geographic locations in system 10, with all inter-location voice traffic transported by way of the voice transport devices 17 and the network 14. Of course, numerous alternative configurations are possible for system 10, e.g., using elements other than those shown in FIG. 1, and it should be understood that the invention is not restricted to use with any particular system configuration. Moreover, the invention can be implemented in whole or in part in software stored on a machine-readable medium, e.g., an optical or magnetic disk, a disk-based storage device, an electronic memory, etc., and executed by a processor associated with a voice transport device, transmitter or other element of a communication system.

An illustrative embodiment of the present invention controls bandwidth consumption by adjusting the coding rate of individual voice samples in an explicit manner, with the following characteristics. Under overload conditions, a subset of the members of a given transport stream will have their coding rate reduced in order to accommodate the overload traffic. Note that the sources of the overload traffic can stem from such events as a voice call being recast as a voiceband data call, e.g., requiring bandwidth enhancement to PCM rates, one or more existing calls becoming active beyond statistical expectations in a silence suppression scenario, or the transport stream being required to support some limited number of calls above normal load expectations. In these and other overload situations, the invention selects a number of the currently active, non-voiceband data calls for selective compression. This frees up additional bandwidth for the new call, the existing call that just became a voiceband data call, or the additional call(s) that had been silence suppressed and has just gone active. The additional bandwidth thus accumulated will be dedicated to such a call, thus supporting the required service.

The remaining voice calls will be treated as follows. On a random, round robin or oldest call starvation basis, some portion of the voice calls in the transport stream will have their coding rates reduced. Such a reduction is signaled by a transmitter to a receiver for proper decoding and assembly. On a subsequent transmission, a different set of existing voice calls is compressed, and the original set of compressed calls is allocated additional bandwidth for higher coding rates to improve fidelity. The service objective is to maximize the bandwidth for each call in order to maximize fidelity, while managing the available bandwidth to support all calls dedicated to the transport stream of interest.

An additional characteristic of the illustrative embodiment of the invention is that all packets are transmitted at a substantially constant rate in the time domain. This constant emission rate allows the far-end receiver to more readily detect lost or misinserted packets, and to apply corrective treatments in a timely and consistent manner. Methods which do not transmit packets at a constant rate in the time domain require additional complexity at the receiver in order to determine that a sample has been missed. A synchronization scheme local to the transmitter is used to help ensure constant packet emission and low overall transport delay.

Figure 2:
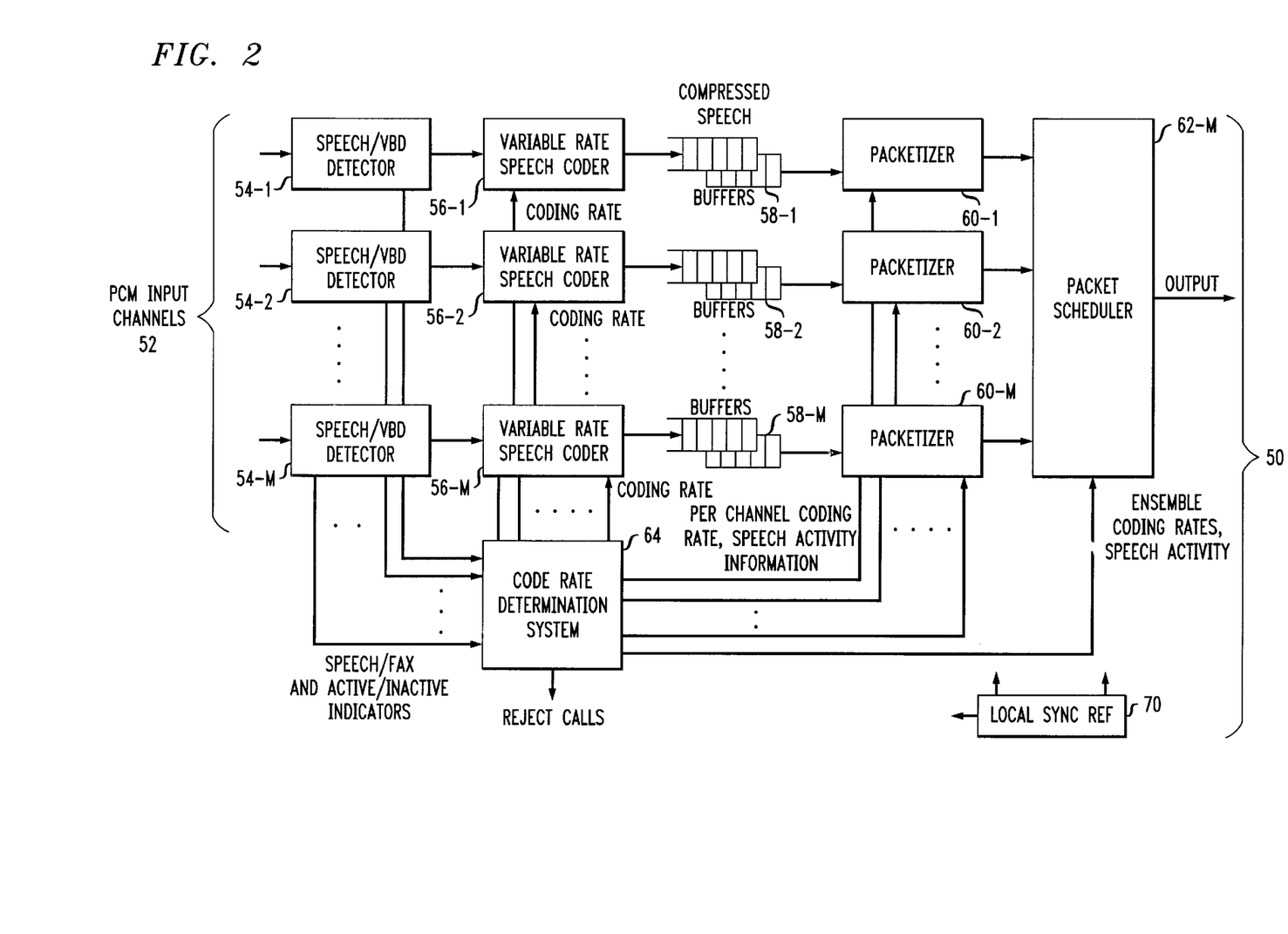
FIG. 2 is a block diagram of a transmitter in accordance with an illustrative embodiment of the invention, suitable for use in a voice transport device in the system of FIG. 1.

FIG. 2 is a block diagram of a transmitter 50 in accordance with the illustrative embodiment of the invention. The transmitter 50 may represent one of the voice transport devices 17 of FIG. 1, or a component of one of the voice transport devices 17. The transmitter 50 includes a set of PCM input channels 52. Associated with each of the PCM input channels is a speech/voice-band data (VBD) detector 54-i, i=1, 2, ... M, a variable rate speech coder (VRSC) 56-i, a set of compressed speech buffers 58-i, and a packetizer 60-i. The transmitter 50 also includes a packet scheduler 62, a code rate determination system 64, and a local sync reference 70.

A given speech/VBD detector 54-i tests for presence/absence of a speech burst or voice-band data, e.g., facsimile (fax), modem-transmitted data, etc., on the corresponding input channel, using well-known conventional techniques. In the presence of speech or VBD, the channel is considered to be in a state referred to as the "active" state. In the absence of speech or VBD, the channel is considered to be in an idle state, also referred to herein as the "inactive" state. The speech/VBD detector 54-i informs the code rate determination system 64 as to whether the corresponding channel is the active or inactive state, and if in the active state whether the activity is speech or VBD. In the inactive state, the speech/VBD detector 54-i continuously searches for speech or VBD signal energy, and when speech or VBD signal energy is detected, information is forwarded to the code rate determination system 64 indicating the start of a speech burst or VBD call. The speech/VBD detector 54-i will then continuously search for the absence of speech or VBD. The absence of speech or VBD signal energy must be qualified for a finite period of time, referred to as a holdover time, before declaring the end of a speech burst or VBD call. The holdover times could be different depending on whether the activity is speech or VBD. When the determination is made that a speech burst or VBD call has ended, information is forwarded to the code rate determination system 64 indicating the end of the speech burst or VBD call.

The code rate determination system 64 receives information from the speech/VBD detector 54-i for each input channel. As noted above, this information describes channel activity state, e.g., active or inactive, and type of active channel, e.g., speech or VBD. The system 64 then determines a new coding rate, if necessary, for a currently active channel and each newly active channel based upon the number of newly active channels, the current coding rate of current active channels, whether a currently active channel is a VBD or speech channel, and the available bandwidth on the outgoing trunk. Similarly, when channels become idle, the coding rate is adjusted for other active channels since more bandwidth is available. In the illustrative embodiment, the code rate determination algorithm, i.e., the algorithm implemented by system 64 to determine the channel coding rate of each channel, maximizes the average coding rate for the set of M input channels. As will be described in greater detail below, this algorithm may include rate assignment implemented on a random basis, a round robin basis, based upon age of the speech burst, or using other suitable techniques or combinations of these and other techniques. Fax calls can be supported at a constant coding such that the integrity of the data content is preserved. In general, the invention can provide the flexibility to allow VBD calls to be treated with a superior quality compression scheme or no compression at all.

Figure 3:
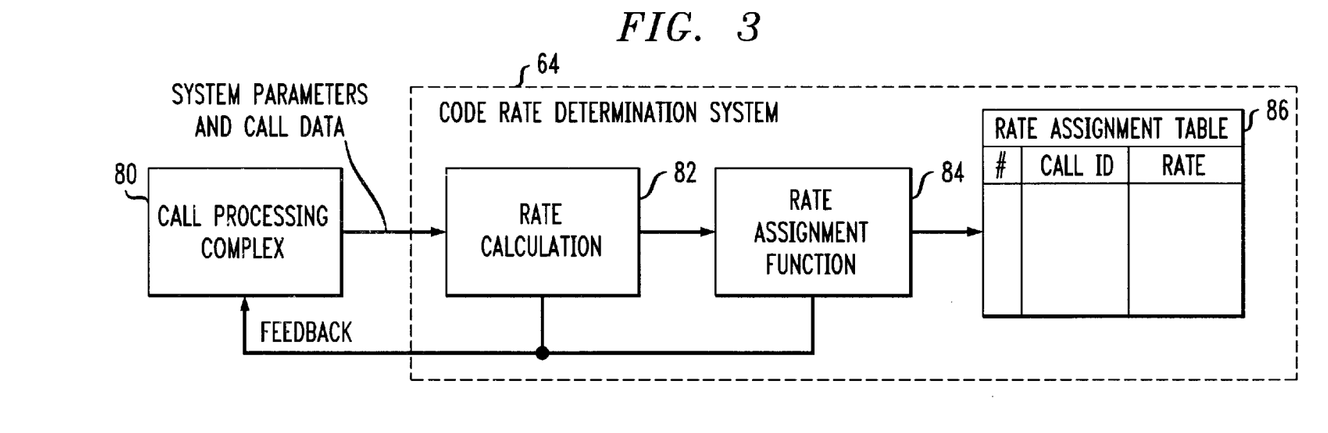
FIG. 3 illustrates the operation of a code rate determination system in the FIG. 2 transmitter.

FIG. 3 shows a block diagram illustrating the operation of the code rate determination system 64 in greater detail. The portion of the transmitter 50 shown in FIG. 3 includes code rate determination system 64 and a call processing complex 80. The code rate determination system 64 includes a rate calculation block 82 and a rate assignment function 84. The call processing complex 80, which may include, e.g., the speech/VBD detectors 56-i and VRSCs 56-i, as well as other processing elements, supplies system parameters and call data to the rate calculation block 82 of system 64, and receives feedback, e.g., determined rates for each channel, from the rate calculation block 82 and the rate assignment function 84. The rate calculation block 82 uses the system parameters and call data from the call processing complex 80 as inputs to a code rate determination algorithm. The resulting code rates are then assigned to specific channels using the rate assignment function 84. A rate assignment table 86 is used to store actual rate assignments for the various channels, and may include, e.g., an entry or index number, a call identifier, and an assigned rate. The rate assignment table, other examples of which will be described below, may be stored in a memory which is part of or otherwise associated with the code rate determination system 64, or in any other memory associated with the transmitter 50. The rate assignment table 86 may be selected from a set of available rate assignment tables, each of which is designed to operate with a particular rate assignment technique.

Referring again to FIG. 2, coding rates determined by the code rate determination system 64 are supplied to the VRSCs 56-i. Although not shown in the block diagram of FIG. 2, a minimal delay buffer may be included between each of the speech/VBD detectors 54-i and the corresponding VRSCs 56-i. The purpose of this delay buffer is to allow the code rate determination system 64 time to gather all the information from the speech/VBD detectors 54-i, to run the above-noted code rate determination algorithm, and then to inform the VRSCs 56-i of their corresponding correct bit rate. It should be noted that a call admission control function may be included in the transmitter 50. Such a function makes a determination, based on current available bandwidth and number of present calls, as to whether a given arriving call can be admitted. The call admission control function can take into account any bandwidth reserved for fax traffic, clear channel traffic, high quality voice traffic, etc.

A given VRSC 56-i accepts PCM speech input from the corresponding speech/VBD detector 54-i, and provides encoded speech samples to the corresponding packetizer 60-i. The type of speech coding, coding bit rate and other control information is provided by the code rate determination system 64. Due to the explicit coder rate control function implemented in the illustrative embodiment, any variable bit rate speech coder can be used in the VRSC 56-i. In certain implementations, G.726 or G.727 ADPCM may be preferred, since these types of speech coding are generally less costly to implement, provide toll quality at 32 kbps, and employ octet-based processing which offers the flexibility of using small packets for reduced over-all system delay. However, other types of speech coders may also be used.

A given packetizer 60-i in FIG. 2 receives coded voice bits as input from the corresponding VRSC 56-i, groups the bits together into packets, pre-pends a header to each of the packets, and passes the packets on to the packet scheduler 62. The coding type, coding rate, and indication of speech activity, as well as any other control information, are provided to the packetizer 60-i by the code rate determination system 64. The header which is pre-pended to the packets by the packetizer 60-i may contain, e.g., a channel ID, an indicator of coding type and rate, an end-of-burst indicator, a sequence number, and error detection/correction information. The error detection/correction may be implemented over the header only or over the entire packet including the header and the payload. This information is used by the receiver to reconstruct the original input signals from the encoded and packetized information. As noted above, an important feature of the illustrative embodiment of the invention is that the packet period for a given call, i.e., the time period between consecutive voice packets for that call, remains substantially constant for the duration of the call regardless of the speech coder bit rate. This reduces the complexity of the transmitter and receiver, and enhances the receiver's ability to handle lost, late-arriving, or misinserted packets.

The packet scheduler 62 of FIG. 2 accepts packets from the M packetizers 60-i and controls the scheduling of their transmission on the associated transmission link, e.g., ATM VC, Frame Relay DLCI, etc. The scheduling is simplified due to the fact that the packetizer 60-i and other elements of the transmitter 50 operate in a synchronous fashion in order to maintain fixed or constant packet emission periods. Control information such as ensemble coding rates and channel activity is provided to the packet scheduler 62 by the code rate determination system 64. Due to the delays inherent in speech coding and packetization, echo cancellation, although not illustrated in the FIG. 2 transmitter, may be necessary. A general rule of thumb is that if one-way delay exceeds approximately 25 milliseconds, echo cancellation is warranted. Echo cancellation techniques are well known in the art, and may be implemented in the transmitter 50 or elsewhere in the packet-based communication system.

Figure 4:
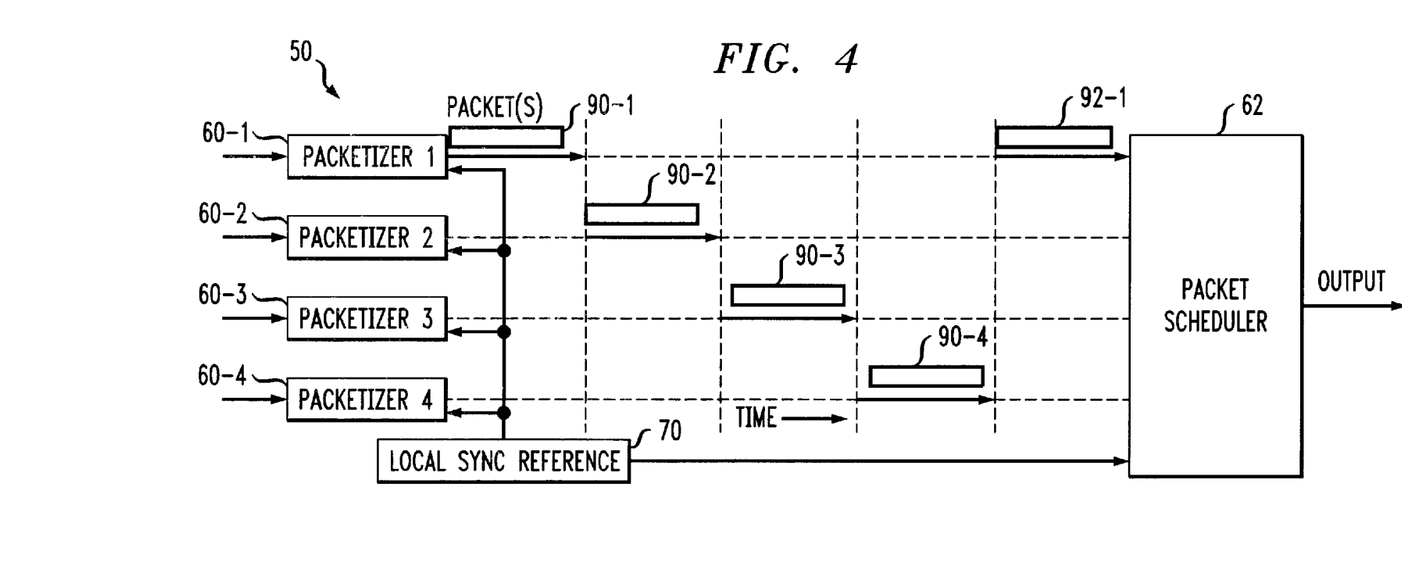
FIG. 4 is a more detailed view of a portion of the FIG. 2 transmitter, illustrating the operation of the packet scheduler.

FIG. 4 illustrates the packet scheduling in transmitter 50 in greater detail, for an example in which M=4, i.e., there are four packetizers 60-i, i=1, 2, 3 and 4. The local sync reference 70 is used to synchronize elements of the transmitter, e.g., the VRSCs 56-i, packetizers 60-i, packet scheduler 62, etc., to the same local clock reference. Synchronization ensures that packets arrive at the packet scheduler 62 at a well-defined time based on the local sync reference. As shown in FIG. 4, a packet 90-1 from packetizer 60-1 is followed in time by a packet 90-2 from packetizer 60-2, a packet 90-3 from packetizer 90-3, and a packet 90-4 from packetizer 60-4. The sequence then continues with another packet 92-1 from packetizer 60-1, and so on. The synchronization also helps to maintain the above-noted fixed packet emission period, to simplify the scheduler 62 and the interface between the scheduler 62 and the packetizers 60-i, and to reduce overall transport delay. As previously noted, the fixed packet emission period reduces the complexity of the transmitter and receiver, and enhances the receiver's ability to handle lost, late-arriving, or misinserted packets.

The code rate determination algorithm implemented by the code rate determination system 64 will now be described in greater detail. The description will make use of the following nomenclature:

M: Total number of input channels rate(1)>rate(2)> . . . >rate(K−1)>rate(K): Voice coding list (K rates, ordered from highest rate to lowest); example: K=4; rate(1)=40 kbps, rate(2)=32 kbps, rate(3)=24 kbps, rate(4)=16 kbps.

Ts: Sample Period; example: Ts=5 ms

N: Total output channels

BW: Total Available Bandwidth, can be fixed or variable

ACL: Active Channel List (initially null)

TNC: Total number of active channels

Typically, bandwidth will be sized for the case BW=M*rate(K). For zero active fax calls, all voice calls can be accommodated with each being compressed at rate(K), i.e., the lowest rate. This generally represents the most efficient use of bandwidth while permitting all channels access to the transmit path. Bandwidth can also be sized using other techniques but may result in a less than maximal use of bandwidth and/or cause blocking of voice calls to the transmit path.

The following are the steps involved in an illustrative code rate determination algorithm in accordance with the invention. These five steps are repeated every Ts sample period:

1) determine the total number of active channels (TNC) from speech/VBD and active/active indicators;

2) determine the total bandwidth (BW) from BW indicator;

3) determine the channels which are no longer active in this sample period and delete from active channel list (ACL), and add any newly active channels to the ACL;

4) determine the total number of channels coded at each coding rate, i.e., TNCrate(1), TNCrate(2), . . . TNCrate (K) where TNCrate(x)=total number of channels coded at rate(x), using channels per rate algorithm (CPRA) with TNC, BW as inputs; and 5) select a coding rate, i.e., rate(1), rate(2) . . . or rate(K), for each active channel, i.e., assign channels to rates according to a preferred distribution, using a channel rate assignment algorithm with TNCrate(1) . . . TNCrate(K) as inputs.

Figure 5:
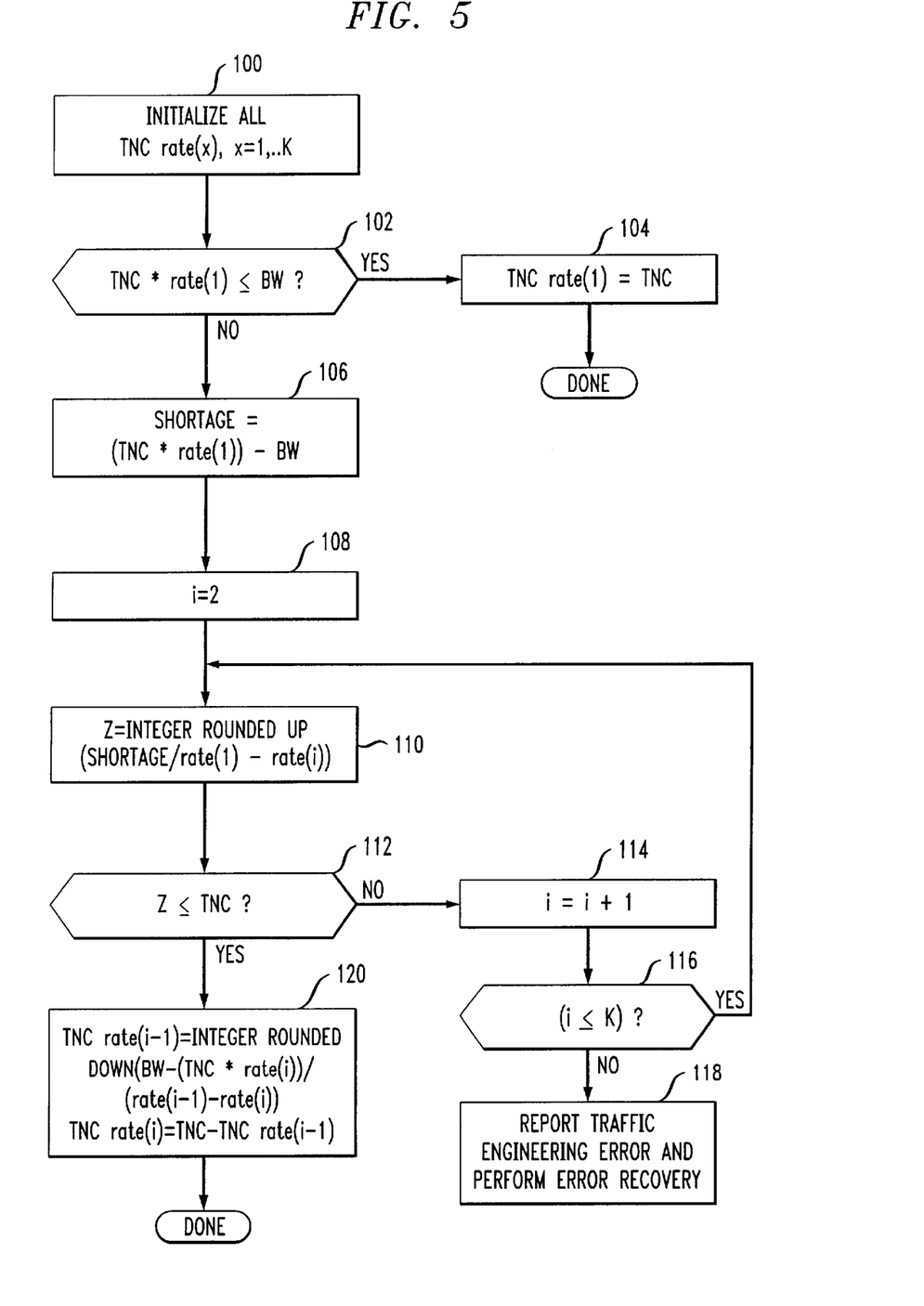
FIG. 5 is a flow diagram illustrating a channels per rate algorithm (CPRA) in accordance with the invention.

FIG. 5 is a flow diagram of a channels per rate algorithm (CPRA) suitable for use in step 4 the channel rate determination process previously described. In the FIG. 5 flow diagram, it is assumed that TNC is the number of actively speaking calls; there are K bit rates available at rates rate(1), rate(2), . . . rate(K) where rate(1)>rate(2)> . . . rate(K); and that TNCrate(x) is the number of calls assigned to rate(x). In step 100, all TNCrate(1) through TNCrate(K) are initialized to zero. Step 102 then determines if the product of TNC and rate(1) is less than or equal to the available bandwidth BW. If TNC*rate(1) is less than or equal to BW, TNCrate(1) is set equal to TNC, and the process is complete for the given sample period. If not, step 106 defines the shortage as (TNC*rate(1))-BW, and step 108 defines index i to be equal to 2. In step 110, a variable Z is defined as the nearest integer, rounded up, of the shortage of step 106 divided by (rate(1)-rate(i)). If Z is determined to be not less than or equal to TNC in step 112, the index i is incremented in step 114, and the resulting value of i is compared to K in step 116. If i is less than or equal to K, the process returns to step 110 to recompute Z. Otherwise, a traffic engineering error is reported and error recovery operations are performed, as shown in step 118. If Z is determined to be less than or equal to TNC in step 112, then TNCrate(i−1) and TNCrate(i) are redefined as shown in step 120, and the process is complete for the given sample period.

A pseudocode example of another CPRA suitable for use in step 4 of the above-described channel rate determination process is as follows:

set TNCrate(1)=TNCrate(2)= . . . =TNCrate(K)=0
if TNC=0 go to END:
else continue
set I=1
set J=K
label LOOP1:
   if BW/TNC is less than rate(I) and I<K, then increment I and go to label LOOP1 else continue
label LOOP2:
   if rate(J)<BW/TNC and J>1 then decrement J and go to label LOOP2 else continue
if I=J then set TNCrate(I)=TNC and go to label END
else continue
set TNCrate(J)=TNC−1

```
set TNCrate(J+1)=1
label LOOP3:
    if (TNCrate(J)*rate(J)+TNCrate(J+1)*rate(J+1))>BW
       then decrement TNCrate(J) and increment TNCrate
       (J+1) and go back to label LOOP3
    else go to label END
label END:
```

A number of different techniques may be used to assign the rates to the channels once the number of channels per rate are calculated by the above-described CPRA. Three different types of algorithms are described below, but it should be understood that other types of algorithms or other techniques could also be used to assign rates to the channels. The first illustrative type of rate assignment algorithm is random rate assignment, which attempts to spread the degradation associated with lowering the bit rate over all of the channels in a random way. This type of algorithm ensures a certain amount of fairness in a larger statistical sense, although it is not as fair as, e.g., a round robin technique. It also has the added feature of making the degradation random, which may be less noticeable from a user perception point of view. In fact, speech coding and channel communication techniques are often developed to tolerate random errors.

Figure 6:
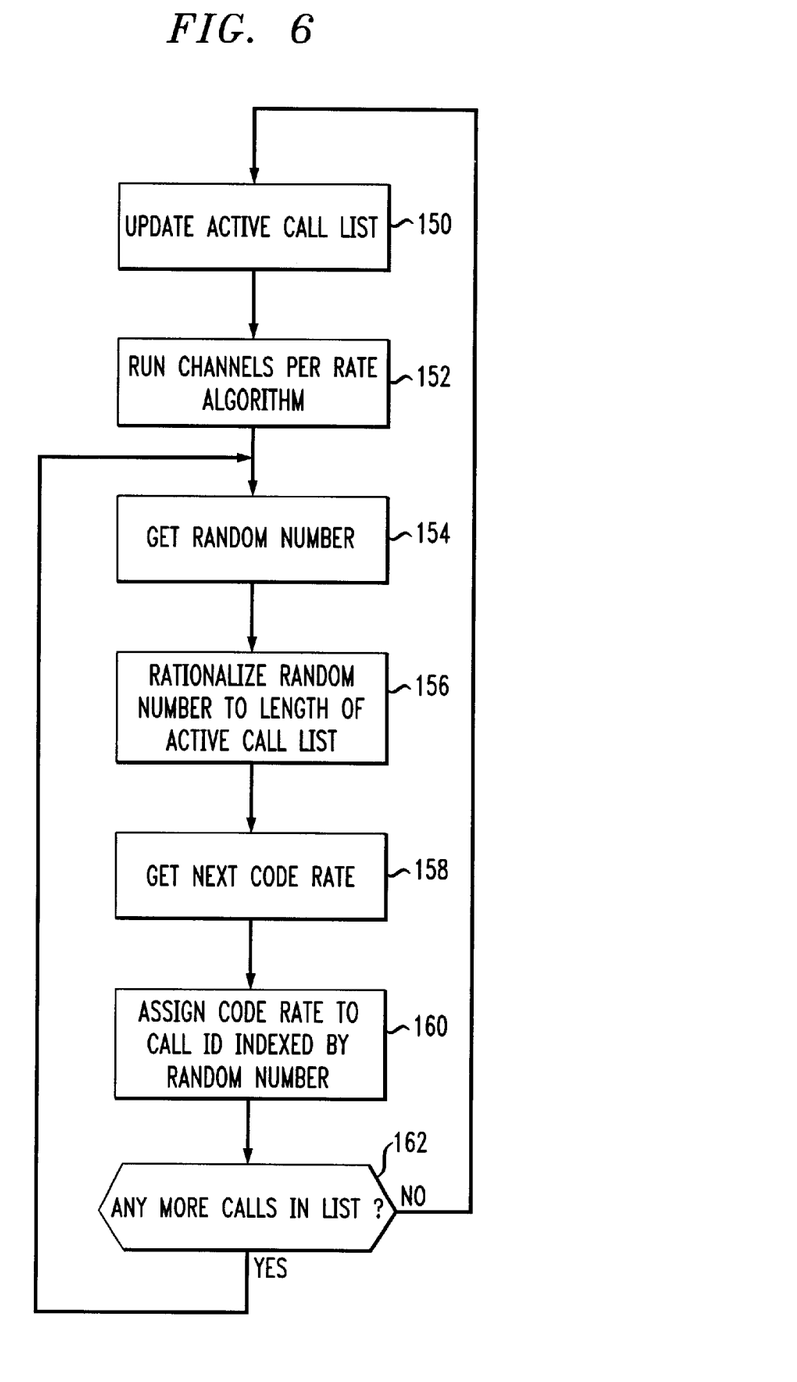
FIG. 6 is a flow diagram illustrating a random rate assignment algorithm in accordance with the invention.

FIG. 6 is a flow diagram illustrating a random rate assignment algorithm in accordance with the invention. As voice calls enter the system, they are each assigned a unique call ID, and the rate assignment table, e.g., table 86 as shown in FIG. 3, is updated to include the new call ID. As calls exit the system, the call ID is removed from the rate assignment table, and is available for reuse. In step 150 of FIG. 6, the active call list is updated, and in step 152 the above-described CPRA is run. The information about the number and value of the code rates is calculated, e.g., 5 calls at 32 kbps and 4 calls at 16 kbps, and stored. In step 154, the process generates or otherwise obtains a random number. In step 156, the random number is rationalized to the length of the active call list, i.e., the random number is adjusted such that it is an integer number in the number space between 1 and the current total number of active calls. In step 158, the next code rate is obtained. The active call list is then accessed, and the call ID whose index equals the current random number is assigned to the current code rate, as shown in step 160.

As code rates are assigned, the number of calls at the current rate are decremented. When that counter reaches zero, the next code rate becomes the current code rate, and the number of calls at that rate becomes the number of calls at the current rate, and is decremented as each call ID is assigned its code rate. Step 162 indicates that the process continues until all of the calls in the active call list have been assigned a code rate.

A pseudocode example of a random rate assignment algorithm in accordance with the invention is given below:

```
ACLindex=1 points to top of ACL and ACLindex=TNC
    points to bottom of ACL. Each list element contains a
    channel identifier CHANID where CHANID=1
    through M.
label START:
if TNC=0 then go to label END
else continue
create copy of ACL called tempACL
set tempACLindex=1
set U=1
set V=TNC
label LOOPA:
    if V=0 then go to label END
    else continue
    get a random number RAND between 1 and V (uniform
       distribution)
    set tempACLindex=RAND
    set CHAN=CHANID contained in tempACL list entry
       pointed to by tempACLindex
    delete entry from tempACL list as pointed to by tem-
       pACLindex
label LOOPB:
    if TNCrate(U)=0 then increment U and go to label
       LOOPB
    else continue
    set CHAN speech encoder to rate(U)
    output rate information for CHAN to packetizer
    decrement TNCrate(U)
    decrement V
    go to label LOOPA
label END:
```

The second illustrative type of rate assignment algorithm to be described herein is referred to as round robin rate assignment. During high speech activity, i.e., during sample periods with large numbers of simultaneous talk spurts, the code rate determination system 64 must select some number of channels to have their bit rates lowered. The round robin algorithm spreads the voice quality degradation associated with lowering the bit rate over many channels in a simple but fair way so as not to degrade excessively any one particular channel. This approach ensures fairness and helps control the worst case degradation time.

Figure 7:
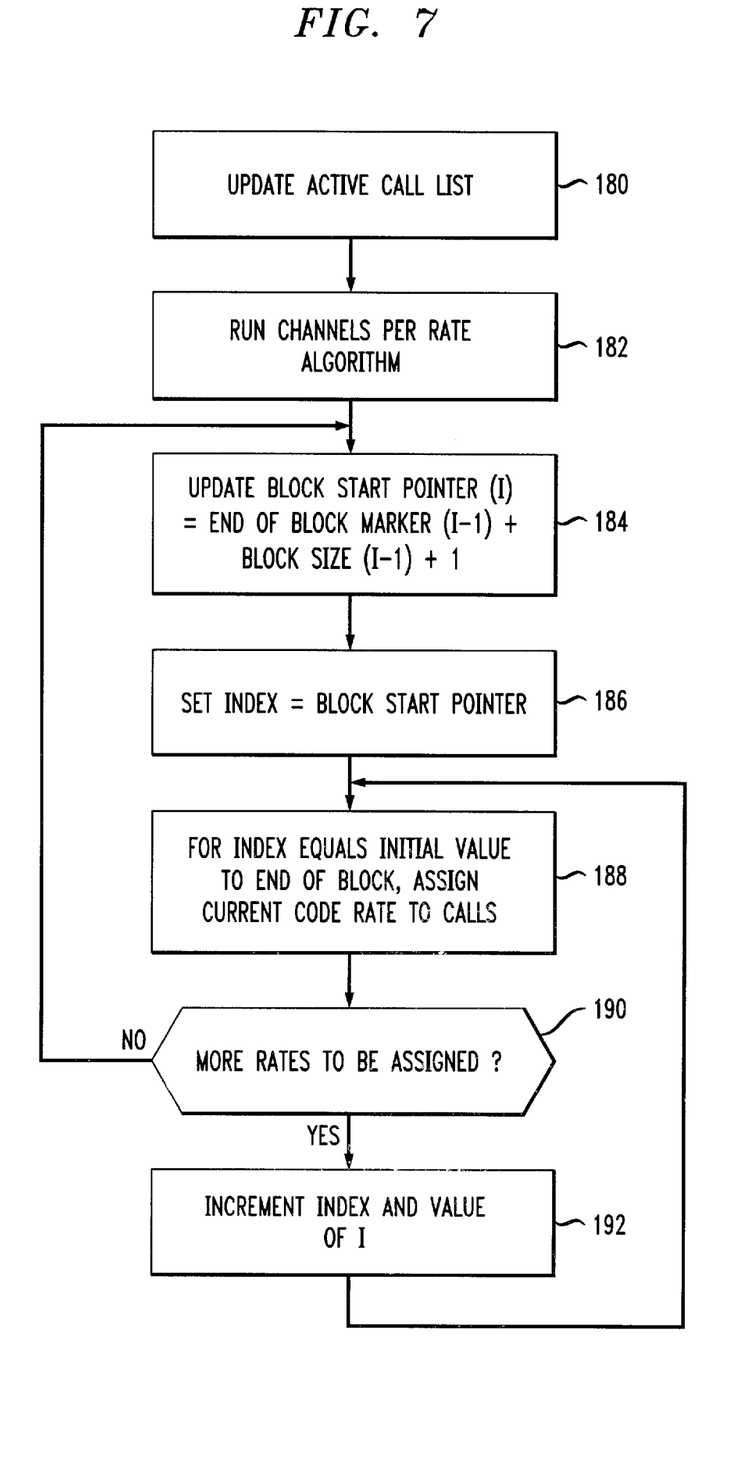
FIG. 7 is a flow diagram illustrating a round robin rate assignment algorithm in accordance with the invention.

FIG. 7 is a flow diagram illustrating one possible implementation of a round robin rate assignment algorithm in accordance with the invention. In the round robin assignment algorithm, the rate assignment table is updated by assigning a call ID to a given active call and adding it to the table, while inactive calls are removed from the table and their call IDs are made available for active calls. In step 180 of FIG. 7, the active call list is updated, and in step 182 the above-described CPRA is run. The information about the number and value of the code rates is calculated and stored. The process allocates code rates R(I) calculated by the CPRA in blocks, where Block Size (I) equates to the current value of N(I), i.e., the number of active calls assigned to rate R(I). At each pass, the process moves the block associated with the highest code rate, e.g., R(1), to a position starting at the last position of the previous pass's highest code rate (End of Block Marker) plus 1, e.g., the Block Start Pointer.

In step 184, the Block Start Pointer (I) is updated to the End of Block Marker (I-1) plus the Block Size (I-1) plus one. In step 186, the index is set to the Block Start Pointer. In step 188, for values of the index equal to the initial value to the End of Block, the current code rate is assigned to calls. Step 190 then checks to see if more rates are to be assigned. If not, the process returns to step 184 as shown for another pass. If there are more rates to be assigned, the index and value of I is incremented in step 192, and the process returns to step 188. As long as there are active calls, the process continues to index the End of Block Marker to the previous End of Block Marker plus the current Block Size plus one, assigning the highest code rates in a round robin fashion such that all active calls are periodically assigned the various bandwidths allocated by the CPRA. The following tables illustrate the first three passes through the FIG. 7 process, for a case in which N(1)=5, R(1)=32 kbps, N(2)=3, and R(2)=16 kbps.

First Pass

| Call ID | R(I) (kbps) | End of Block (I) |
|---|---|---|
| 1 | 32 | |
| 2 | 32 | |
| 3 | 32 | |
| 4 | 32 | |
| 5 | 32 | X |
| 6 | 16 | |
| 7 | 16 | |
| 8 | 16 | |

Second Pass

| Call ID | R(I) (kbps) | End of Block (I) |
|---|---|---|
| 1 | 32 | |
| 2 | 32 | X |
| 3 | 16 | |
| 4 | 16 | |
| 5 | 16 | |
| 6 | 32 | |
| 7 | 32 | |
| 8 | 32 | |

Third Pass

| Call ID | R(I) (kbps) | End of Block (I) |
|---|---|---|
| 1 | 16 | |
| 2 | 16 | |
| 3 | 32 | |
| 4 | 32 | |
| 5 | 32 | |
| 6 | 32 | |
| 7 | 32 | X |
| 8 | 16 | |

A pseudocode example of another implementation of a round robin rate assignment algorithm in accordance with the invention is as follows:

```
ACLindex=1 points to top of ACL and ACLindex=TNC
    points to bottom of ACL. Each list element contains a
    channel identifier CHANID where CHANID=1
    through M.
label START:
if TNC=0 then go to label END
else continue
set ACLindex=1
set U=1
set V=TNC
label LOOPA:
    if V=0 then go to label ADJUST
    else continue
    set CHAN=CHANID contained in ACL list entry
        pointed to by ACLindex
    increment ACLindex
label LOOPB:
    if TNCrate(U)=0 then increment U and go to label
        LOOPB
    else continue
    set CHAN speech coder to rate(U)
    output rate information for CHAN to packetizer
    decrement TNCrate(U)
    decrement V
    go to label LOOPA
label ADJUST:
    delete entry at bottom of ACL and re-insert at top
label END:
```

The third illustrative type of rate assignment algorithm to be described herein is referred to as Oldest Talking Channel—Lowest Rate (OTC-LR). This technique is based on the fact that channels known to have been active, e.g., talking, for the longest time, are most likely to stop. Therefore, it may be appealing from a talk-spurt-length fairness sense to select the oldest talking channels for bit rate reduction. Such an algorithm can be implemented by organizing the ACL in accordance with the age of the call, adding new calls to the top of the ACL and moving aging calls to the end of the ACL, and then allocating bandwidth on a preferential basis with the preference going to the calls at the top of the ACL. A circular queue may be used, with the head pointer pointing to the newest call, and the tail pointer to the oldest. As new calls arrive, the channels per rate is calculated as previously described. The active call list is updated by removing all calls that have gone inactive, and then compressing the list, i.e., specifically eliminating any "blanks" from the list. New calls are then appended to the head of the list. As time passes, new calls continue to be added to the list and old calls removed with the net effect of moving an existing call "down" the list until it too is eliminated. Code rate assignments in this case are substantially equivalent to those in the round robin process of FIG. 7, except that the index is set to the head pointer, not the block start pointer, such that the highest code rate is assigned to the newest call, and the lowest code rate to the oldest call.

A pseudocode version of an OTC-LR algorithm in accordance with the invention is given below.

```
ACL is ordered from youngest channel (top of list) to
    oldest channel (bottom of list). ACLindex=1 points to
    top of ACL and ACLindex=TNC points to bottom of
    ACL. Each list element contains a channel identifier
    CHANID where CHANID=1, 2, . . . M.
label START:
if TNC equals zero then go to label END
else continue
set ACLindex=1
set U=1
set V=TNC
label LOOPA:
    if V=0 then go to label END
    else continue
    set CHAN equal to CHANID contained in ACL list
        entry pointed to by ACLindex
    increment ACLindex
label LOOPB:
    if TNCrate(U)=0 then increment U and go to label
        LOOPB
    else continue
    set CHAN speech encoder to rate(U)
    output rate information for CHAN to packetizer
    decrement TNCrate(U)
    decrement V
    go to label LOOPA
label END:
```

The above-described embodiments of the invention are intended to be illustrative only. Numerous alternative embodiments within the scope of the following claims will be apparent to those skilled in the art.

What is claimed is:

1. A method for communicating information in a packet-based communication system, the method comprising the steps of:

determining a total number of active channels of a given transport stream of the system to be coded at each of a plurality of code rates; and assigning the code rates to the active channels in accordance with a specified code rate assignment process, such that a bandwidth constraint of the transport stream is satisfied for a defined time period;

wherein the code rates are periodically adjustable in conjunction with the assigning step as a function of the total number of active channels and the bandwidth constraint, such that unused bandwidth resulting from one or more channels becoming idle during the time period is distributable among the active channels.

2. The method of claim 1 wherein at least a subset of the active channels are voice channels.

3. The method of claim 2 wherein the defined time period corresponds to a sample period of at least one of the active voice channels.

4. The method of claim 1 further including the step of generating packets for a given one of the active channels encoded at a corresponding assigned code rate, such that a time period between consecutive packets generated for the given channel is substantially constant for the duration of a voice call associated with the given channel.

5. The method of claim 1 wherein the determining step includes determining the total number of active channels from indicators generated by detectors associated with a set of channels in the system.

6. The method of claim 1 wherein the determining step includes determining which of the channels are no longer active in the defined time period.

7. The method of claim 1 wherein the code rate assignment process assigns the code rates to the channels using a random rate assignment.

8. The method of claim 1 wherein the code rate assignment process assigns the code rates to the channels using a round robin rate assignment.

9. The method of claim 1 wherein the code rate assignment process assigns the code rates to the channels such that a channel which has been active for a longer period of time than another channel is assigned a lower code rate than the other channel.

10. The method of claim 1 wherein the assigning step includes selecting a rate assignment table for use with the specified code rate assignment process from a set of available rate assignment tables.

11. The method of claim 1 further including the step of reserving a designated amount of available bandwidth for a voice-band data call to be sent over a given one of the channels.

12. The method of claim 1 further including the step of synchronizing the generation of packets for each of the channels in a transmitter of the system to a local synchronization reference associated with the transmitter.

13. An apparatus for communicating information in a packet-based communication system, the apparatus comprising:

a transmitter comprising a code rate determination system coupled to one or more variable rate coders and one or more packetizers, the transmitter being operative to determine a total number of active channels of a given transport stream of the system to be coded at each of a plurality of code rates, and to assign the code rates to the active channels in accordance with a specified code rate assignment process, such that a bandwidth constraint of the transport stream is satisfied for a defined time period;

wherein the code rates are periodically adjustable as a function of the total number of active channels and the bandwidth constraint, such that unused bandwidth resulting from one or more channels becoming idle during the time period is distributable among the active channels.

14. The apparatus of claim 13 wherein at least a subset of the active channels are voice channels.

15. The apparatus of claim 13 wherein the defined time period corresponds to a sample period of at least one of the active voice channels.

16. The apparatus of claim 13 wherein the transmitter is further operative to generate packets for a given one of the active channels encoded at a corresponding assigned code rate, such that a time period between consecutive packets generated for the given channel is substantially constant for the duration of a voice call associated with the given channel.

17. The apparatus of claim 13 wherein the transmitter includes a set of detectors, with each of the detectors operative to determine whether a given one of a set of channels in the system is active or inactive.

18. The apparatus of claim 13 wherein the code rate assignment process assigns the code rates to the channels using a random rate assignment.

19. The apparatus of claim 13 wherein the code rate assignment process assigns the code rates to the channels using a round robin rate assignment.

20. The apparatus of claim 13 wherein the code rate assignment process assigns the code rates to the channels such that a channel which has been active for a longer period of time than another channel is assigned a lower code rate than the other channel.

21. The apparatus of claim 13 wherein the code rate assignment process assigns the code rates to the channels using a rate assignment table selected from a set of available rate assignment tables.

22. The apparatus of claim 13 wherein the transmitter is further operative to reserve a designated amount of available bandwidth for a voice-band data call to be sent over a given one of the channels.

23. The apparatus of claim 13 wherein the transmitter further includes a local synchronization reference for synchronizing the generation of packets for each of the channels in the transmitter.

24. A machine-readable medium storing one or more programs which when executed by a processor implement the steps of:

determining a total number of active channels of a given transport stream of the system to be coded at each of a plurality of code rates; and assigning the code rates to the active channels in accordance with a specified code rate assignment process, such that a bandwidth constraint of the transport stream is satisfied for a defined time period;

wherein the code rates are periodically adjustable in conjunction with the assigning step as a function of the total number of active channels and the bandwidth constraint, such that unused bandwidth resulting from one or more channels becoming idle during the time period is distributable among the active channels.

* * * * *